United States Patent
Zhibo et al.

(10) Patent No.: US 11,177,857 B2
(45) Date of Patent: Nov. 16, 2021

(54) COMMUNICATIONS NETWORK FOR COMMUNICATION BETWEEN A POWER ELECTRONICS ELEMENT AND A CONTROL UNIT

(71) Applicant: ABB Power Grids Switzerland AG, Baden (CH)

(72) Inventors: Pang Zhibo, Västerås (SE); Dacfey Dzung, Wettingen (CH); Mikael Davidsson, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 224 days.

(21) Appl. No.: 16/467,385

(22) PCT Filed: Dec. 21, 2016

(86) PCT No.: PCT/EP2016/082233
§ 371 (c)(1),
(2) Date: Jun. 6, 2019

(87) PCT Pub. No.: WO2018/113960
PCT Pub. Date: Jun. 28, 2018

(65) Prior Publication Data
US 2020/0091964 A1 Mar. 19, 2020

(51) Int. Cl.
| | |
|---|---|
| *H04L 23/00* | (2006.01) |
| *H04B 3/54* | (2006.01) |
| *H04W 4/80* | (2018.01) |
| *H02M 7/86* | (2006.01) |
| *H04B 10/80* | (2013.01) |
| *H02J 13/00* | (2006.01) |

(52) U.S. Cl.
CPC .............. *H04B 3/542* (2013.01); *H02M 7/86* (2013.01); *H04B 3/548* (2013.01); *H04B 10/80* (2013.01); *H04W 4/80* (2018.02); *H02J 13/00022* (2020.01); *H04B 2203/547* (2013.01)

(58) Field of Classification Search
CPC ...... H05B 47/19; H05B 47/105; H05B 47/16; Y02B 20/40; H04B 3/542; H04B 3/548; H04B 10/80; H04W 4/80; H02M 7/86
USPC ...................................... 340/425.1
See application file for complete search history.

(56) References Cited

U.S. PATENT DOCUMENTS

| | | | |
|---|---|---|---|
| 9,954,458 B2* | 4/2018 | Choi ................... | H02M 5/45 |
| 2012/0057520 A1 | 3/2012 | Mumtaz | |

(Continued)

FOREIGN PATENT DOCUMENTS

WO WO 2013/178249 A1 12/2013

OTHER PUBLICATIONS

International Preliminary Report on Patentability, issued in PCT/EP2016/082233, dated Mar. 18, 2019.

(Continued)

*Primary Examiner* — Tesfaldet Bocure
(74) *Attorney, Agent, or Firm* — Slater Matsil, LLP (57) ABSTRACT

A communications network for communication between at least one power electronics element and at least one control unit is disclosed. According to one or more embodiments, the communications network can be described as a communications network having parts or portions thereof employing multi-hop and/or hybrid communication.

23 Claims, 5 Drawing Sheets

(56) References Cited

U.S. PATENT DOCUMENTS

2013/0342131 A1* 12/2013 Recker ................. H05B 47/11
                                                    315/292
2016/0172860 A1   6/2016 Lipan et al.
2018/0262272 A1*  9/2018 Ashrafi ............... H04L 9/0858
2020/0076548 A1*  3/2020 Pang .................... H02J 3/36
2020/0319621 A1* 10/2020 Roy ..................... A61H 33/00

OTHER PUBLICATIONS

International Search Report, issued in PCT/EP2016/082233, dated Aug. 25, 2017.
Written Opinion of the International Preliminary Examining Authority, issued in PCT/EP2016/082233, dated Dec. 6, 2018.
Written Opinion of the International Searching Authority, issued in PCT/EP2016/082233, dated Aug. 25, 2017.

* cited by examiner

COMMUNICATIONS NETWORK FOR COMMUNICATION BETWEEN A POWER ELECTRONICS ELEMENT AND A CONTROL UNIT

TECHNICAL FIELD

The present invention generally relates to the field of power systems, such as, for example, power transmission systems. Specifically, the present invention relates to a communications network for communication between at least one power electronics element and at least one control unit, wherein the at least one control unit is configured to control the at least one power electronics element by means of transmitting at least one control signal to the at least one power electronics element.

BACKGROUND

HVDC power transmission has become increasingly important due to increasing need for power supply or delivery and interconnected power transmission and distribution systems. In a HVDC power system there is generally included an interface arrangement including or constituting a HVDC converter station, which is a type of station configured to convert high voltage Direct Current (DC) to Alternating Current (AC), or vice versa. A HVDC converter station may comprise a plurality of elements such as the converter itself (or a plurality of converters connected in series or in parallel), one or more circuit breakers, transformers, capacitors, filters, and/or other auxiliary elements. Converters, which often are referred to as 'converter valves', or simply 'valves', may comprise a plurality of solid-state based devices such as semiconductor devices and may be categorized as line-commutated converters (LCCs) or voltage source converters (VSCs), e.g. depending on the type of switches (or switching devices) which are employed in the converter. A plurality of solid-state semiconductor devices such as IGBTs may be connected together, for instance in series, to form a building block, or cell, of a HVDC converter, or HVDC converter valve. HVDC converter valves may be arranged indoors, in so called converter valve halls. Elements which for example may be included in a converter, such as switches or switching devices, circuit breakers, transformers, capacitors, filters, and/or other auxiliary elements, will in the following be referred to as power electronics components (PECs).

PECs, which for example may be included in converters, may be provided with communication means. Such communication means should preferably be robust and reliable and have a relatively low latency. Operation of PECs, such as, for example, IGBTs, may be controlled by means of a control unit by way of transmission of control signals, e.g., including switching commands or instructions, using multiple optical fiber (OF) communication links. OF links may however be expensive to fabricate, install and maintain, and may have a shorter life time and a higher rate of failure as compared with the PECs. Alternative solutions in the form of wireless communication links for replacing OF communication links have been proposed. However, in many applications, the distance between the control unit and PECs may be desired or even required to be as long as up to a hundred meters, in particular in high voltage systems such as in HVDC converters and high voltage circuit breakers. Such a relatively long distance between the control unit and PECs may make the use of wireless communication links between the control unit and PECs difficult. For example, using wireless communication links between the control unit and PECs where the distance between the control unit and PECs is hundreds of meters, it may be difficult to implement a communicative connection between the control unit and the PECs having a high reliability and high data rate. Wireless communication links may utilize radio frequency (RF) communication techniques or means. However, in case there is no direct line-of-sight between the control unit and the PECs, for example due to components or obstacles being located between the control unit and PECs such as metallic planes, dishes, columns, or beams, RF signals may be significantly distorted due to fading, reflection, and attenuation. This may make the use of wireless communication links between the control unit and PECs even more difficult. PECs may be employed in applications other than HVDC power systems, such as, for example, in AC power systems such as a so called flexible AC transmission system (FACTS).

SUMMARY

In view of the above, a concern of the present invention is to provide a communications network for communication between at least one power electronics element and at least one control unit, which communications network may reduce or even eliminate the need for OF communication links in a communication system between the at least one power electronics element and the at least one control unit.

A further concern of the present invention is to provide a communications network for communication between at least one power electronics element and at least one control unit, which may facilitate or allow for galvanic separation between the at least one power electronics element and other components, such as, for example, the at least one control unit and/or the at least one intermediate transmit/receive unit.

A further concern of the present invention is to provide a communications network for communication between at least one power electronics element and at least one control unit, which communications network may facilitate or allow for relatively long distances, e.g., up to a hundred meters or even more, between the at least one power electronics element and the at least one control unit, while still being capable of providing a high reliability, short latency, and/or a high data rate for the communications between the at least one power electronics element and the at least one control unit.

A further concern of the present invention is to provide a communications network for communication between at least one power electronics element and at least one control unit, which communications network may be capable of providing a high reliability, short latency, and/or and a high data rate for the communications between the at least one power electronics element and the at least one control unit even in case there is no direct line-of-sight between the at least one power electronics element and the at least one control unit, for example due to obstacles being located between the at least one power electronics element and the at least one control unit.

To address at least one of these concerns and other concerns, a communications network in accordance with the independent claim is provided. Preferred embodiments are defined by the dependent claims.

According to a first aspect there is provided a communications network, or communications system, for communication between at least one power electronics element and at least one control unit. The at least one power electronics element and the at least one control unit are separately arranged. The at least one control unit is configured to control the at least one power electronics element by means of transmitting at least one control signal to the at least one power electronics element. Each of the at least one power electronics element and the at least one control unit comprises a transmit/receive unit configured to transmit and/or receive at least one signal. The communications network comprises at least one communication link for communication of at least one signal over at least a part or portion of the communications network. At least one communication link at least in part utilizes a wireless communication link. At least one communication link at least in part utilizes a wired communication link. The communications network comprises at least one intermediate transmit/receive unit configured to receive at least one signal transmitted over the communications network in a direction from the at least one power electronics element and to the at least one control unit, or vice versa, and transmit the received at least one signal over the communications network in a direction to the at least one control unit or the at least one power electronics element, respectively.

In the context of one or more embodiments of the present invention, and for illustrating principles of the one or more embodiments of the present invention, the communications network can be described as a communications network having parts or portions thereof employing multi-hop and/or hybrid communication.

In the context of the present application, by multi-hop communication it is meant that there are one or more intermediate transmit/receive units comprised in the communications network for communication of at least one signal over at least a part or portion of the communications network. The communications network may comprise a plurality of communication links, which may be communicatively connected by means of the at least one intermediate transmit/receive unit. The one or more intermediate transmit/receive units may function as relays or repeaters in the communications network. Further in the context of the present application, by hybrid communication it is meant that at least one communication link at least in part utilizes a wireless communication link (e.g., a communication link over an air interface), and at least one communication link at least in part utilizes a wired communication link (e.g., comprising at least one optical waveguide), for communication of at least one signal over at least a part or portion of the communications network. The communication link(s) which at least in part utilizes a wireless communication link may be different from or the same as the communication link(s) which at least in part utilizes a wired communication link.

In the context of the present application, by wireless communication link it is meant in principle any type of communicative link, connection or coupling utilizing one or more wireless techniques or means for effecting communication, such, as for example, at least one radio frequency (RF) communication link, and/or an infrared communication link (e.g., a communication link employing infrared light) or another type of free-space optical communication link (e.g., based on laser). Further in the context of the present application, by wired communication link it is meant in principle any type of communicative link, connection or coupling utilizing one or more non-wireless techniques or means for effecting communication, such, as for example, at least one optical waveguide, or optical transmission line (e.g., an optical fiber), and/or at least one electrical conductor (e.g., a cable or wire, e.g., a copper conductor or cable, or copper wire). Alternatively, "wired communication link" could be described as "non-wireless communication link", which hence may employ, for example, at least one optical waveguide, or optical transmission line, such as an optical fiber, and/or at least one cabling or wiring.

In the context of the present application, by the communications network comprising at least one communication link, it is meant that devices coupled to the communications network (e.g., the at least one control unit and/or the at least one power electronics element) are connected relatively to each other via communication link(s) between the respective devices. For example, for a given device coupled to the communications network, there may be respective communication links connecting the device with some or all of the other devices coupled to the communications network. In the communications network, devices, such as, for example, the at least one control unit and/or the at least one power electronics element, which are coupled to the communications network may each have access to at least one signal (e.g., information, messages, commands and/or data) that is communicated over the communications network, and the devices may be connected relatively to each other via communication links between the respective devices. For example, one or more of the devices coupled to the communications network may be 'broadcasting' or 'multicasting' at least one signal over the communications network, and some or even all of the other devices coupled to the communications network may be able to receive the broadcasted or multicasted at least one signal. A given device coupled to the communications network may be 'addressable' in the sense that it may be configured to selectively exchange at least one signal with (i.e., receive at least one signal from and/or transmit at least one signal to) the communications network, based for example on one or more particular identifiers (e.g., one or more addresses) assigned to it.

The communications network may exhibit a network topology that for example is based on a star network topology, a ring network topology and/or a mesh network topology, but is not limited thereto.

By at least one communication link at least in part utilizing a wireless communication link and at least one communication link at least in part utilizing a wired communication link for communication of at least one signal over at least a part or portion of the communications network—entailing, e.g., that one or more parts or portions of the communications network employ hybrid communication—the overall number of OF communication links in the communications network may be kept relatively low as compared to existing communications network or systems for controlling operation of PECs, including, for example, IGBTs, by means of a control unit transmitting control signals over a multiple of OF communication links.

In the context of the present application, by a power electronics element it is meant in principle any element, module or unit including one or more power electronics components, for example comprising solid-state semiconductor devices or power semiconductor components such as IGBTs.

The at least one power electronics element may hence for example comprise at least one converter (e.g., an HVDC converter). According to one or more embodiments of the present invention, the at least one control unit may hence be configured to control at least one converter.

A converter, e.g., an HVDC converter, may comprise at least one controller for controlling operation of the power electronics component(s) comprised in the converter.

According to one or more embodiments of the present invention, the at least one power electronics element may comprise one or more power electronics components, and the at least one control unit may comprise a controller for controlling operation of the power electronics component(s). Thus, according to one or more embodiments of the present invention, the communications network may possibly be for communication within a converter.

Modules, or building blocks or cells, of converters may be on relatively high electric potential with respect to ground potential, for example 1 kV or more, possibly up to 30 kV or even more. By at least one communication link at least in part utilizing a wireless communication link, galvanic separation between the at least one power electronics element (e.g., comprising or being constituted by one or more converter modules) and other components, such as, for example, the at least one control unit and/or the at least one intermediate transmit/receive unit, may be facilitated or allowed.

By one or more parts or portions of the at least one communication link employing multi-hop communication—entailing, e.g., that there may be one or more intermediate transmit/receive units comprised in the communications network—the communications network may facilitate or allow for relatively long distances, e.g., up to a hundred meter or even more, between the at least one power electronics element and the at least one control unit, while still being capable of providing a high reliability, short latency, and/or a high data rate for the communications between the at least one power electronics element and the at least one control unit. This is due that the risk of signals transmitted from the at least one control unit being 'shaded' by obstacles that may be located between the at least one control unit and the at least one power electronics element may become higher with increasing distance between the at least one power electronics element and the at least one control unit. The obstacles may for example comprise one or more metallic planes, dishes, columns, or beams. If the communications network would only employ single-hop communication and not employ hybrid communication (but only, e.g., wireless communication employing RF communication), there might, in case there would be obstacles located between the at least one control unit and the at least one power electronics element such that there is no direct line-of-sight between the at least one control unit and the at least one power electronics element, be significant distortions of RF signals transmitted by the at least one control unit due to fading, reflection and attenuation.

In the context of the present application, by a transmit/receive unit it is meant a device that is capable of both transmitting and receiving, in a wireless and/or wired fashion. The transmit/receive unit may for example comprise a transceiver, for example an RF transceiver.

According to one or more embodiments of the present invention, by the at least one power electronics element and the at least one control unit being separately arranged, it may be entailed that the at least one power electronics element and the at least one control unit are not mechanically connected or coupled to each other, and/or are not arranged within the same housing or structure.

According to one or more embodiments of the present invention, by the at least one intermediate transmit/receive unit being separately arranged from the at least one power electronics element and/or the at least one control unit, it may be entailed that the at least one intermediate transmit/receive unit is not mechanically connected or coupled to the at least one power electronics element and/or to the at least one control unit, or that the at least one intermediate transmit/receive unit is not arranged within the same housing or structure as the at least one power electronics element and/or the at least one control unit.

The communications network may for example enable or facilitate communication of at least one signal between the at least one power electronics element and the at least one control unit that may comprise one or more control signals transmitted from the at least one control unit to the at least one power electronics element, and one or more condition, status and/or measurement signals, transmitted from the at least one power electronics element to the at least one control unit.

The control signal(s) may for example comprise or be constituted by, for example, Pulse Width Modulation (PWM) signal(s), but is/are not limited thereto.

For example, in a case where the at least one power electronics element comprises or is constituted by a converter, the control signal(s) may for example comprise a set of switching states for the converter and possibly a set of switching time instants. Each of the elements of the set of switching time instants may correspond to a respective one of the elements of the set of switching states, and may correspond to the instant in time when the converter shall be operated (e.g., switched) into the switching state corresponding to the respective element of the set of switching states. The case where the control signal(s) comprises a set of switching states for the converter and a corresponding set of switching time instants may be applicable for example in a multi-cell converter topology. In a multi-cell converter topology, there may be a local clock in each cell, and the local clocks in the respective cells may be synchronized with each other. A controller in each cell may carry out the switching of the converter cell according to the control signal(s). However, if the bandwidth of the communications network is relatively high and the latency of the communications network is relatively low, a set of switching time instants may not be required to be included in the control signal(s). A controller in each cell may carry out the switching of the converter cell according to the control signal(s) immediately, or substantially immediately upon receipt of the control signal(s).

The measurement signal(s) may comprise measured values of different parameters, e.g. operational parameters, of the at least one power electronics element. The measurement signal(s) may for example comprise different parameters, e.g. operational parameters, of at least one cell of a converter. The condition and/or status signal(s) may for example comprise one or more values obtained from diagnostics procedures or processes relating to the at least one power electronics element.

The communication of at least one signal between the at least one power electronics element and the at least one control unit by way of the communications network may for example be carried out in a frequency range between 30 GHz and 300 GHz.

As will be further described in the following with reference to the figures, at least one intermediate transmit/receive unit may be configured to transmit and/or receive at least one signal over a wireless communication link. In alternative or in addition, at least one intermediate transmit/receive unit may be configured to transmit and/or receive at least one signal over a wired communication link.

The communications network may comprise a plurality of intermediate transmit/receive units, wherein each of the intermediate transmit/receive units may be configured to receive at least one signal transmitted over the communications network in the direction from the at least one power electronics element to the at least one control unit, or vice versa, and transmit the received at least one signal over the communications network in the direction to the at least one control unit or the at least one power electronics element, respectively. As will be further described in the following with reference to the figures, the plurality of intermediate transmit/receive units may be arranged such that one of the intermediate transmit/receive units is configured to receive at least one signal transmitted by another one of the intermediate transmit/receive units. The one of the intermediate transmit/receive units may be configured to receive at least one signal transmitted by the other one of the intermediate transmit/receive units over a wired communication link and/or over a wireless communication link.

The communications network may be configured to permit communication between the at least one control unit and the at least one power electronics element via the communication link(s) using communication channel(s) utilizing time, space and/or frequency division. The communications network may be configured to permit communication between the at least one control unit and the at least one power electronics element based on TDMA (Time-Division Multiple Access), SDMA (Space-Division Multiple Access), FDMA (Frequency-Division Multiple Access), OFDMA (Orthogonal Frequency-Division Multiple Access), and/or CDMA (Code Division Multiple Access). Such schemes are as such known in the art, and further description thereof is therefore omitted.

The communications network, or the at least one communication link, may be configured to set up or implement half duplex or full duplex communication mode (uni-directional or bi-directional communication, respectively) between the at least one power electronics element and at least one control unit. In other words, there may at a given time be communication either from the at least one power electronics element or at least one control unit to the at least one control unit or the at least one power electronics element, respectively, or there may be bidirectional communication between the at least one power electronics element and at least one control unit occurring at the same time (e.g., using different channels in utilizing time, space and/or frequency division.

The communications network, or the at least one communication link, may be configured so that communication between devices coupled to the communications network (e.g., the at least one control unit, the at least one intermediate transmit/receive unit and/or the at least one power electronics element) is based on broadcasting or multicasting or point-to-point communication, or any combination thereof.

According to one or more embodiments of the present invention, at least one of the at least one power electronics element, the at least one control unit or the at least one intermediate transmit/receive unit may comprise at least one directional and/or polarized antenna, e.g., an RF antenna. By means of a directional and/or polarized antenna, the propagation of at least one signal over the communications network may be facilitated, and interference may be reduced or even minimized.

According to a second aspect there is provided a control unit configured to be used in conjunction with a communications network according to the first aspect and to control at least one power electronics element by means of transmitting at least one control signal to the at least one power electronics element via the communications network.

According to a third aspect there is provided a power electronics element configured to be used in conjunction with a communications network according to the first aspect and to receive at least one control signal transmitted by a control unit according to the second aspect via the communications network.

According to a fourth aspect there is provided a system which comprises at least one power electronics element, at least one control unit, and a communications network according to the first aspect for communication between the at least one power electronics element and the at least one control unit.

The at least one power electronics element may for example comprise a converter comprising a plurality of cells. The at least one control unit may be configured to control at least one of the plurality of cells by means of transmitting at least one control signal to the at least one of the plurality of cells. Any one or each of the plurality of cells may comprise a transmit/receive unit configured to transmit and/or receive at least one signal. The at least one control unit may be configured to control the plurality of cells independently of each other by means of transmitting at least one control signal to each of the plurality of cells. At least one of the plurality of cells may include an intermediate transmit/receive unit of the communications network. The converter may for example include or be constituted by a High Voltage Direct Current (HVDC) converter.

Each of the converter and the at least one control unit may for example be arranged within a structure or building. The converter may for example be arranged in a converter valve hall. The at least one control unit may for example be arranged in a control room. The converter valve hall and the control room may be arranged in the same structure or building, or in different structures or buildings. The control room may be separately located with respect to the converter valve hall.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
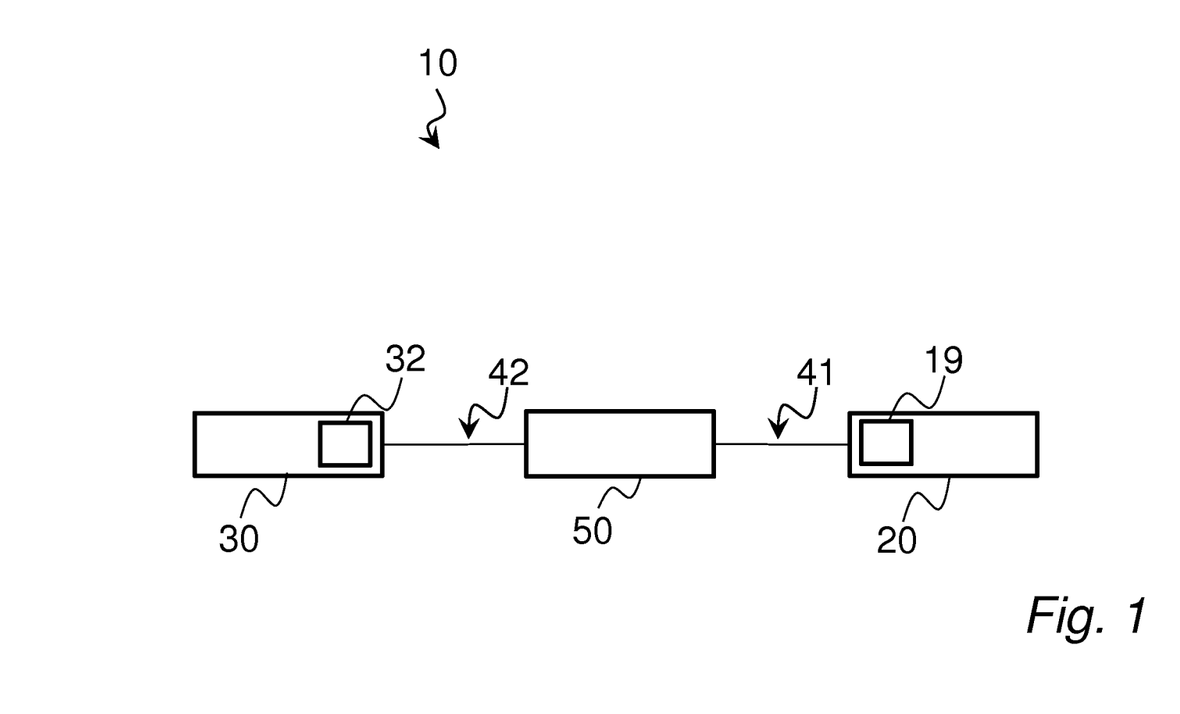
FIGS. 1 to 5 are schematic views of communications networks according to embodiments of the present invention.

FIG. 1 is a schematic view of a communications network, or communications system, 10 according to an embodiment of the present invention. The communication network 10 is for communication between a power electronics element 20 and a control unit 30, which may be separately arranged.

The control unit 30 is configured to control the power electronics element 20 by means of transmitting at least one control signal to the power electronics element 20. Each of the power electronics element 20 and the control unit 30 comprises a transmit/receive unit 19 and 32, respectively, configured to transmit and/or receive at least one signal.

The power electronics element 20 may for example comprise or be constituted by a converter configured to convert high voltage DC to AC, or vice versa. The converter may for example comprise a plurality of cells (not shown in FIG. 1). The converter may for example comprise or be constituted by a HVDC converter. The control unit 30 may be configured to control at least one of the plurality of cells of the converter by means of transmitting at least one control signal to the at least one of the plurality of cells. Each of the plurality of cells of the converter may comprise a transmit/receive unit configured to transmit and/or receive at least one signal.

Although FIG. 1 only shows one power electronics element 20, it is to be understood that the communications network 10 may comprise several power electronics elements 20, each of which may be controlled by the control unit 30. Possibly, the control unit 30 may be configured to control each power electronics element independently of the other ones. It is further to be understood that the communications network 10 may comprise several control units.

The communications network 10 comprises at least one communication link for communication of at least one signal over at least a part or portion of the communications network 10. According to the illustrated embodiment of the present invention, there are two communication links 41, 42. The communication link 41 interconnects the power electronics element 20 and, e.g., an intermediate transmit/receive unit 50, and the communication link 42 interconnects the intermediate transmit/receive unit 50 and, e.g., the control unit 30.

Although the communication links 41, 42 are illustrated as wired communication links, at least one communication link in the communication network 10 at least in part utilizes a wireless communication link, and at least one (possibly other) communication link in the communication network 10 at least in part utilizes a wired communication link.

The communications network 10—or the communication links 41, 42—comprises the intermediate transmit/receive unit 50. The intermediate transmit/receive unit 50 is configured to receive at least one signal transmitted over the communications network 10 in a direction from the power electronics element 20 and to the control unit 30, or vice versa, and transmit the received at least one signal over the communications network 10 in a direction to the control unit 30 or the power electronics element 20, respectively.

The communications network 10 can hence be described as a communications network having parts or portions thereof employing multi-hop and/or hybrid communication.

Although FIG. 1 only shows one intermediate transmit/receive unit 50, and two communication links 41, 42, it is to be understood that the communications network 10 in accordance with one or more embodiments of the present invention may comprise more than one intermediate transmit/receive unit and more than two communication links. By means of the communication links comprised in the communications network 10, devices (e.g., control unit(s), power electronics element(s) and intermediate transmit/receive units) which are coupled to the communications network 10 may be interconnected with each other.

As indicated in the foregoing, the wireless communication link may in principle comprise or be constituted by any type of communicative link, connection or coupling utilizing one or more wireless techniques or means for effecting communication, such, as for example, at least one RF communication link, an infrared communication link or another type of free-space optical communication link. Furthermore, the wired communication link may in principle comprise or be constituted by any type of communicative link, connection or coupling utilizing one or more non-wireless techniques or means for effecting communication, such, as for example, at least one optical waveguide—e.g., an optical fiber—or at least one electrical conductor—e.g., copper conductor, or copper wire.

In the following description referring to FIGS. 2 to 5, the wired communication link may be described as an optical communication link, e.g., comprising at least one optical waveguide, such as, for example, at least one optical fiber, and the wireless communication link may be described as an RF communication link. However, it is to be understood that this is merely for describing principles of embodiments of the present invention, and that the optical communication link and RF communication link are non-limiting examples in accordance with one or more embodiments of the present invention.

Figure 2:
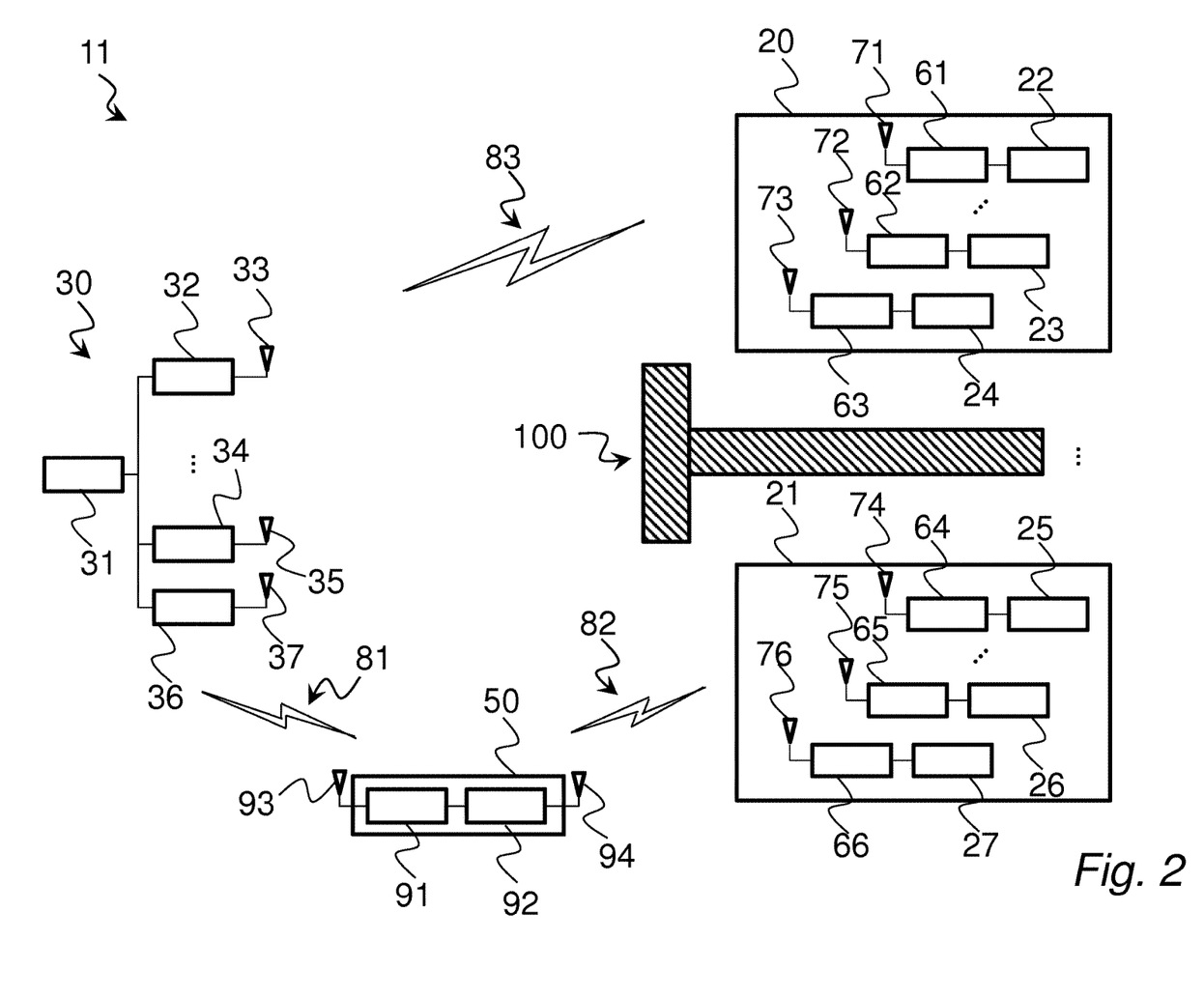

FIG. 2 is a schematic view of a communications network, or communications system, 11 according to an embodiment of the present invention. The communication network 11 is for communication between a control unit 30 and power electronics elements 20 and 21. The control unit 30 and the power electronics elements 20, 21 may be separately arranged.

The control unit 30 comprises a control module 31 configured to generate, for example, at least one control signal that can be transmitted to the power electronics elements 20 and 21 via the communications network 11 in order to control the power electronics elements 20 and 21 (possibly independently of each other).

The control unit 30 further comprises several transmit/receive units 32, 34, 36 configured to transmit and/or receive at least one signal. Each of the transmit/receive units 32, 34, 36 comprises a wireless transceiver having an antenna (e.g., an RF antenna and/or an infrared antenna) 33, 35 and 37, respectively. As indicated in FIG. 2 there may possibly be more than three transmit/receive units 32, 34, 36 included in the control unit 30. There may however, according to one or more embodiments of the present invention, be fewer than three transmit/receive units included in the control unit 30.

The power electronics element 20 comprises three power electronic components 22, 23, 24, which, for example, may comprise components included in a converter configured to convert high voltage DC to AC, or vice versa. The power electronics element 20 comprises three transmit/receive units 61, 62, 63, each comprising a wireless transceiver having an antenna (e.g., an RF antenna) 71, 72, 73, respectively. As illustrated in FIG. 2, the power electronic components 22, 23, 24 are connected to the transmit/receive units 61, 62, 63, respectively.

The power electronics element 21 comprises three power electronic components 25, 26, 27, which, for example, may comprise components included in a converter configured to convert high voltage DC to AC, or vice versa. The power electronics element 21 comprises three transmit/receive units 64, 65, 66, each comprising a wireless transceiver having an antenna (e.g., an RF antenna) 74, 75, 76, respectively. As illustrated in FIG. 2, the power electronic components 25, 26, 27 are connected to the transmit/receive units 64, 65, 66, respectively.

The communications network 11 comprises an intermediate transmit/receive unit 50. The intermediate transmit/receive unit 50 is configured to receive at least one signal transmitted over the communications network 11 in a direction from the power electronics elements 20, 21 and to the control unit 30, or vice versa, and transmit the received at least one signal over the communications network 11 in a direction to the control unit 30 or the power electronics elements 20, 21, respectively.

As illustrated in FIG. 2, the intermediate transmit/receive unit 50 may comprise a wireless to wireless bridge, comprising two wireless transceivers 91, 92, each having an antenna (e.g., an RF antenna) 93 and 94, respectively. Thereby, the intermediate transmit/receive unit 50 may be configured to receive and transmit at least one signal over wireless communication links 81, 82. For example, by means of the wireless communication link 81, the intermediate transmit/receive unit 50 may receive at least one signal from, or transmit at least one signal to, the control unit 30, and by means of the wireless communication link 82, the intermediate transmit/receive unit 50 may receive at least one signal from, or transmit at least one signal to, the power electronics element 21. The wireless communication links 81, 82 may for example comprise at least one radio frequency communication link, at least one infrared communication link or at least one other type of free-space optical communication link.

Figure 3:
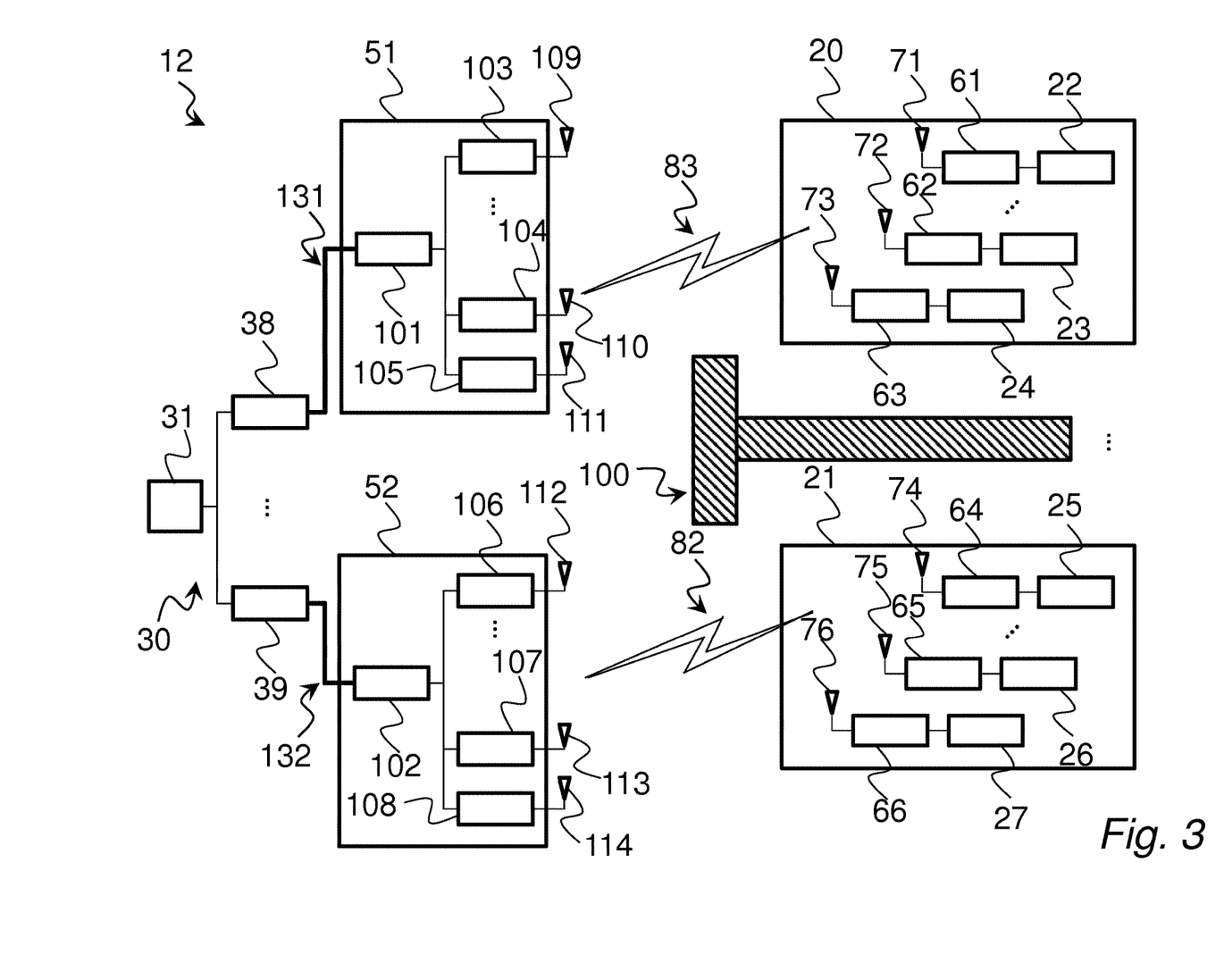
Figure 4:
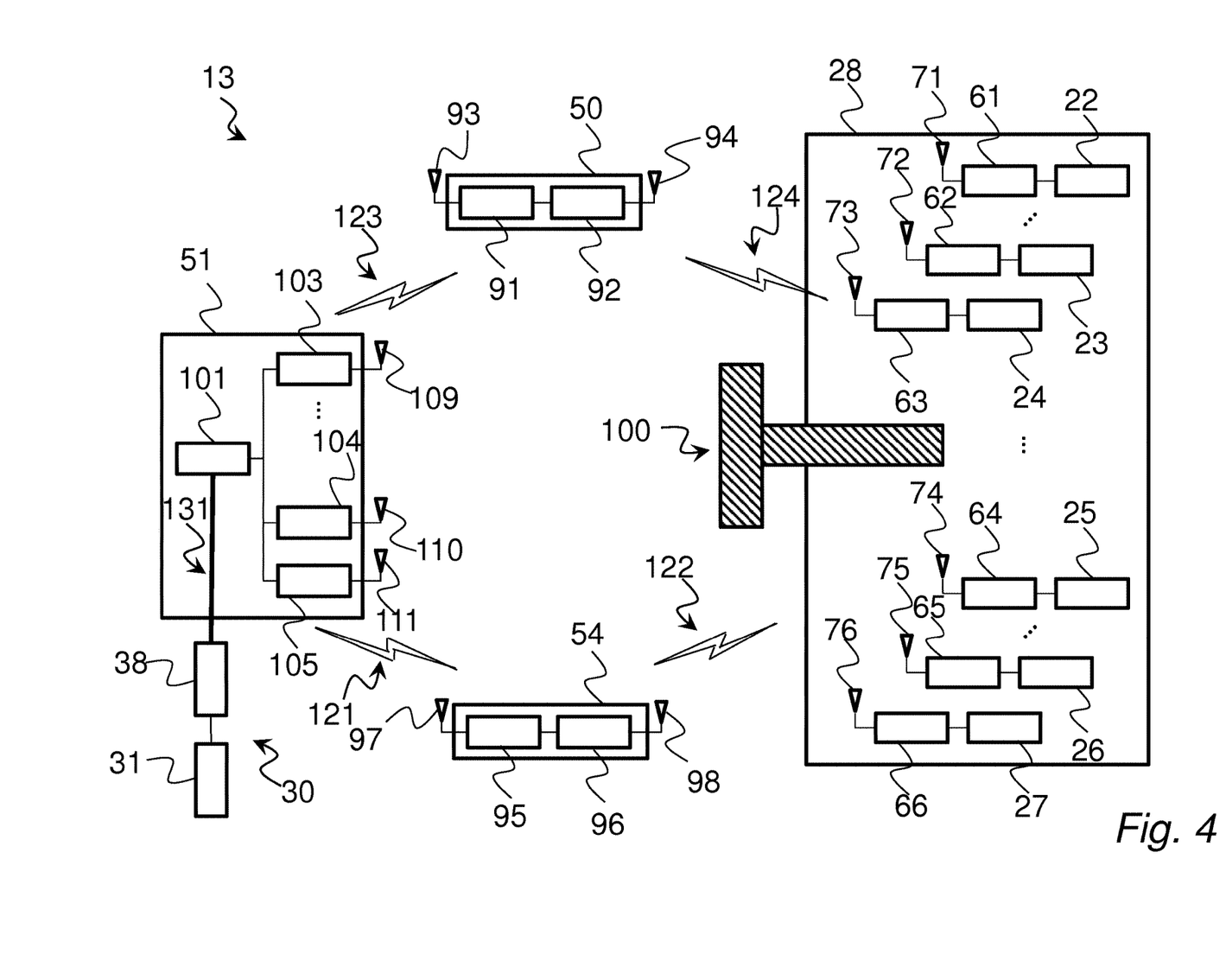
Figure 5:
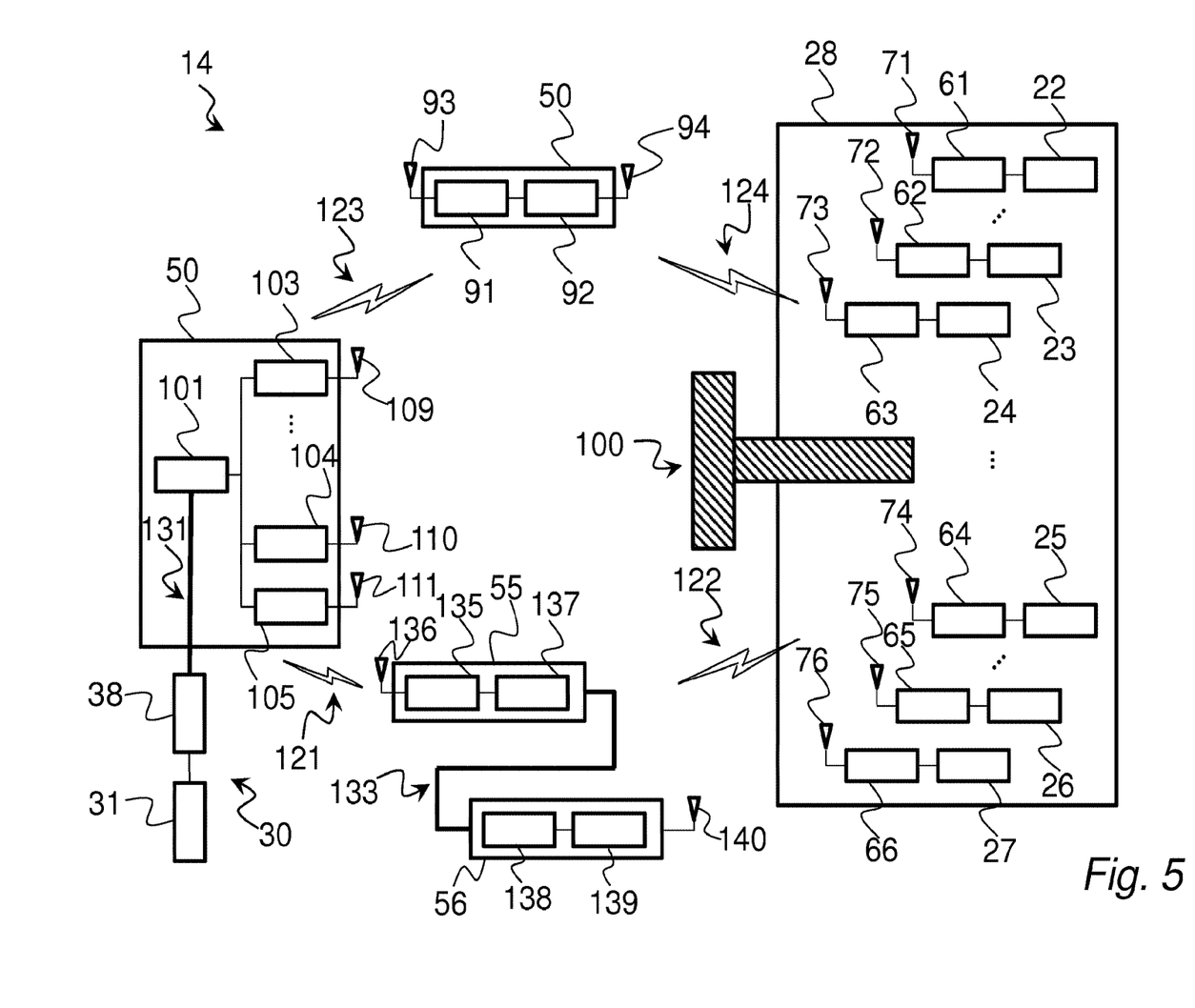

According to an embodiment of the present invention, the intermediate transmit/receive unit 50 may in alternative or in addition be configured to receive and/or transmit at least one signal over a wired communication link, for example comprising at least one optical waveguide or at least one electrical conductor (not shown in FIG. 2; see FIGS. 3 to 5). The communications network 11 comprises one or more additional intermediate transmit/receive units (not shown in FIG. 2) configured to receive and/or transmit at least one signal over such a wired communication link. The communications network 11 can hence, according to one or more embodiments of the present invention, be described as a communications network having parts or portions thereof employing multi-hop and/or hybrid communication.

Any one or each of the wireless transceivers included in the control unit 30, the power electronics elements 20, 21 and the intermediate transmit/receive unit 50 may for example be based on software defined radio (SDR) technology with customized physical layer and Medium Access Layer (MAC) layer design, and may for example be configured to operate within a frequency band between 30 GHz and 300 GHz.

As illustrated in FIG. 2, the communications network 11 may comprise a wireless communication link 83 between, e.g., the control unit 30 and the power electronics element 20. The wireless communication link 83 may for example comprise at least one radio frequency communication link, at least one infrared communication link or at least one other type of free-space optical communication link. The communication between the control unit 30 and the power electronics element 20 using the wireless communication link 83 may hence constitute a one-hop wireless communication link.

As indicated in FIG. 2, if the distance between the control unit 30 and the power electronics elements 20, 21 is relatively small, a one-hop communication link therebetween may possibly be sufficient. However, in case there is no direct line-of-sight between the control unit 30 and the power electronics elements 20, 21, such as, for example, due to an obstacle, schematically indicated by the element having reference numeral 100, that may be located between the control unit 30 and the power electronics elements 20, 21, at least one signal transmitted from the control unit 30 may be 'shaded' by the obstacle 100. The obstacle 100 could for example comprise one or more metallic planes, dishes, columns, or beams. Such a scenario may be applicable for example in medium voltage converter applications. To address such a situation, the intermediate transmit/receive unit 50 may be deployed in the communications network 11 in order to achieve a multi-hop communication link between the control unit 30 and the power electronics element (e.g., the power electronics element 21, as indicated in FIG. 2), for example by way of the intermediate transmit/receive unit 50 and the wireless communication links 81, 82, in accordance with the illustrated embodiment of the present invention.

FIG. 3 is a schematic view of a communications network, or communications system, 12 according to an embodiment of the present invention. The communication network 12 is for communication between a control unit 30 and power electronics elements 20 and 21. The control unit 30 and the power electronics elements 20, 21 may be separately arranged.

The communication network 12 illustrated in FIG. 3 is similar to the communication network 11 illustrated in FIG. 2. The same reference numerals in FIGS. 2 and 3 indicate the same or similar components, having the same or similar function.

With further reference to FIG. 3, the control unit 30 comprises a control module 31 configured to generate, for example, at least one control signal that can be transmitted to the power electronics elements 20 and 21 via the communications network 12 in order to control the power electronics elements 20 and 21, possibly independently of each other.

The control unit 30 further comprises two transmit/receive units 38 and 39 configured to transmit and/or receive at least one signal. Each of the transmit/receive units 38 and 39 comprises an optical waveguide transceiver, e.g., including or being constituted by an optical fiber transceiver. As indicated in FIG. 3 there may possibly be more than two transmit/receive units 38, 39 included in the control unit 30. There may however, according to one or more embodiments of the present invention, be only one transmit/receive unit included in the control unit 30.

The communications network 12 comprises two intermediate transmit/receive units 51 and 52. Each of the intermediate transmit/receive units 51 and 51 is configured to receive at least one signal transmitted over the communications network 12 in a direction from the power electronics elements 20, 21 and to the control unit 30, or vice versa, and transmit the received at least one signal over the communications network 12 in a direction to the control unit 30 or the power electronics elements 20, 21, respectively.

As illustrated in FIG. 3, each of the intermediate transmit/receive units 51 and 52 may comprise an optical to wireless bridge, each comprising an optical waveguide transceiver 101, 102, e.g., including or being constituted by an optical fiber transceiver. Each of the optical waveguide transceivers 101, 102 of the respective intermediate transmit/receive units 51 and 52 is connected to wireless transceivers 103-105 and 106-108, respectively, each wireless transceiver 103-108 having an antenna (e.g., an RF antenna) 109-114, respectively. Each of the intermediate transmit/receive units 51 and 52 is connected to respective ones of the transmit/receive units 38 and 39 by way of respective optical waveguide wired communication links 131, 132. Thereby, each of the intermediate transmit/receive units 51, 52 may be configured to transmit and receive at least one signal over the optical waveguide wired communication link 131, 132, and over wireless communication links 82, 83, respectively. Each of the optical waveguide wired communication links 131 and 132 may for example include or be constituted by at least one optical fiber communication link and/or at least one electrical conductor.

For example, by means of the optical waveguide wired communication link 132, the intermediate transmit/receive unit 52 may receive at least one signal from, or transmit at least one signal to, the control unit 30, and by means of the wireless communication link 82, the intermediate transmit/receive unit 52 may receive at least one signal from, or transmit at least one signal to, e.g., the power electronics element 21. Additionally, by means of the optical waveguide wired communication link 131, the intermediate transmit/receive unit 51 may for example receive at least one signal from, or transmit at least one signal to, the control unit 30, and by means of the wireless communication link 83, the intermediate transmit/receive unit 51 may for example receive at least one signal from, or transmit at least one signal to, e.g., the power electronics element 20.

The communications network 12 can hence, according to one or more embodiments of the present invention, be described as a communications network having parts or portions thereof employing multi-hop and/or hybrid communication.

Any one or each of the intermediate transmit/receive units 51 and 52 may comprise an optical to wireless bridge. The optical to wireless bridge may for example employ or be based on RF-over-fiber technology, which as such is known in the art. However, the optical to wireless bridge could in alternative or in addition employ or be based on, for example, Gigabit Ethernet, EtherCat or proprietary optical communication technologies. The RF-over-fiber technology does not require demodulating and decoding the wireless at least one signal (e.g., wirelessly transmitted packet(s)). Instead, the wireless at least one signal may be directly up-converted or down-converted between the expected frequencies of RF and OF signals. This may reduce the processing delay, e.g. down to nanoseconds or less, which is small compared with the whole propagation delay of power electronics control loops (which are on the order of μs). Also, the wireless transceivers 103-105 may share the same optical waveguide transceiver 101 by employing different wavelengths for different ones of the wireless transceivers 103-105. Similarly, the wireless transceivers 106-108 may share the same optical waveguide transceiver 102 by employing different wavelengths for different ones of the wireless transceivers 106-108.

Any one or each of the optical waveguide wired communication links 131, 132 and the optical waveguide transceivers 101, 102 may for example employ or be based on single mode plastic optical fiber, or multiple mode glass optical fiber.

As indicated in FIG. 3, if the distance between the control unit 30 and the power electronics elements 20, 21 is too long for a one-hop communication link therebetween to provide sufficient capacity or performance, optical waveguide wired communication links 131 and 132 can be used to connect the control unit 30 with the intermediate transmit/receive units 51 and 52, which may be deployed relatively close to the power electronics elements 20, 21. Several intermediate transmit/receive units, including, e.g., the intermediate transmit/receive units 51 and 52, can be deployed in order to address a situation where at least one signal transmitted from the control unit 30 to the power electronics elements 20, 21 may be 'shaded' by the obstacle 100. By way of a topology such illustrated in FIG. 3, the number of OF communication links in a communication system between the power electronics elements 20, 21 and the control unit 30 may be kept relatively low.

FIG. 4 is a schematic view of a communications network, or communications system, 13 according to an embodiment of the present invention. The communication network 13 is for communication between a control unit 30 and a power electronics element 28. The control unit 30 and the power electronics element 28 may be separately arranged.

The communication network 13 illustrated in FIG. 4 is similar to the communication networks 11 and 12 illustrated in FIGS. 2 and 3, respectively. The same reference numerals in FIGS. 2, 3 and 4 indicate the same or similar components, having the same or similar function.

In contrast to the communication networks 11 and 12 illustrated in FIGS. 2 and 3, respectively, the communications network 13 comprises a single relatively large power electronics structure, constituted by the power electronics element 28. The elements included in the power electronics element 28 which have the same reference numerals as the elements included in the power electronics elements 20 and 21 illustrated in FIGS. 2 and 3 are the same or similar, and have the same or similar function.

The intermediate transmit/receive unit 50 illustrated in FIG. 4 is similar or identical to the intermediate transmit/receive unit 50 illustrated in FIG. 2, and the functions thereof are similar or identical.

The communication network 13 illustrated in FIG. 4 further comprises an intermediate transmit/receive unit 54. The intermediate transmit/receive unit 54 is configured to receive at least one signal transmitted over the communications network 13 in a direction from the power electronics element 28 and to the control unit 30, or vice versa, and transmit the received at least one signal over the communications network 13 in a direction to the control unit 30 or the power electronics element 28, respectively. As illustrated in FIG. 4, the intermediate transmit/receive unit 54 may comprise a wireless to wireless bridge, comprising two wireless transceivers 95, 96, each having an antenna (e.g., an RF antenna) 97 and 98, respectively. Thereby, the intermediate transmit/receive unit 54 may be configured to receive and transmit at least one signal over wireless communication links 121, 122. For example, by means of the wireless communication link 121, the intermediate transmit/receive unit 54 may receive at least one signal from, or transmit at least one signal to, the control unit 30, and by means of the wireless communication link 122, the intermediate transmit/receive unit 54 may receive at least one signal from, or transmit at least one signal to, e.g., the power electronics element 28. The wireless communication links 121, 122 may for example comprise at least one radio frequency communication link, at least one infrared communication link or at least one other type of free-space optical communication link.

Further, the intermediate transmit/receive unit 50 may be configured to receive and transmit at least one signal over wireless communication links 123, 124. For example, by means of the wireless communication link 123, the intermediate transmit/receive unit 50 may receive at least one signal from, or transmit at least one signal to, the control unit 30, and by means of the wireless communication link 124, the intermediate transmit/receive unit 50 may receive at least one signal from, or transmit at least one signal to, e.g., the power electronics element 28. The wireless communication links 123, 124 may for example comprise at least one radio frequency communication link, at least one infrared communication link or at least one other type of free-space optical communication link.

The communications network 13 can hence, according to one or more embodiments of the present invention, be described as a communications network having parts or portions thereof employing multi-hop and/or hybrid communication.

Any one or each of the wireless transceivers included in the intermediate transmit/receive units 50, 51 and 54 and in the power electronics component 28 may for example be based on software defined radio (SDR) technology with customized physical layer and Medium Access Layer (MAC) layer design, and may for example be configured to operate within a frequency band between 30 GHz and 300 GHz.

As illustrated in FIG. 4, the intermediate transmit/receive units 50 and 54 may comprise wireless to wireless bridges.

FIG. 4 illustrates a scenario where, compared to the scenario illustrated in FIG. 3, the distance between the power electronics element 28 and the intermediate transmit/receive unit 51 (e.g., comprising an optical to wireless bridge) is relatively long. In order to address this situation, the intermediate transmit/receive units 50 and 54 (e.g., comprising wireless to wireless bridges) may be deployed.

FIG. 5 is a schematic view of a communications network, or communications system, 14 according to an embodiment of the present invention. The communication network 14 is for communication between a control unit 30 and a power electronics element 28. The control unit 30 and the power electronics element 28 may be separately arranged.

The communication network 14 illustrated in FIG. 5 is similar to the communication networks 13 illustrated in FIG. 4. The same reference numerals in FIGS. 4 and 5 indicate the same or similar components, having the same or similar function.

Compared to the communication networks 13 illustrated in FIG. 4, the intermediate transmit/receive unit 54 illustrated in FIG. 4 has been replaced with two intermediate transmit/receive units 55 and 56.

As illustrated in FIG. 5, the intermediate transmit/receive unit 55 may comprise a wireless to optical bridge, comprising a wireless transceiver 135, the wireless transceiver 135 having an antenna (e.g., an RF antenna) 136. The wireless transceiver 135 of the intermediate transmit/receive unit 55 is connected to an optical waveguide transceiver 137, e.g., including or being constituted by an optical fiber transceiver.

The intermediate transmit/receive unit 55 is connected to, e.g., the intermediate transmit/receive unit 50 by way of the wireless communication link 121, which for example may comprise at least one radio frequency communication link. In alternative or in addition it could comprise at least one infrared communication link or at least one other type of free-space optical communication link.

The intermediate transmit/receive unit 55 is connected to the intermediate transmit/receive unit 56 by way of an optical waveguide wired communication link 133. The optical waveguide wired communication link 133 may for example include or be constituted by at least one optical fiber communication link and/or at least one electrical conductor.

Thus, the intermediate transmit/receive unit 55 may be configured to transmit and receive at least one signal over the optical waveguide wired communication link 133 and over the wireless communication link 121, respectively. For example, by means of the optical waveguide wired communication link 133, the intermediate transmit/receive unit 55 may receive at least one signal from, or transmit at least one signal to, the intermediate transmit/receive unit 56, and by means of the wireless communication link 121, the intermediate transmit/receive unit 55 may receive at least one signal from, or transmit at least one signal to, e.g., the intermediate transmit/receive unit 50.

According to the illustrated embodiment of the present invention, the intermediate transmit/receive unit 56 comprises an optical to wireless bridge, comprising an optical waveguide transceiver 138, e.g., including or being constituted by an optical fiber transceiver. The optical waveguide transceiver 138 of the intermediate transmit/receive unit 56 is connected to a wireless transceiver 139, which has antenna (e.g., an RF antenna) 140.

The intermediate transmit/receive unit 56 is connected to, e.g., the power electronics element 28 by way of the wireless communication link 122, which for example may comprise at least one radio frequency communication link. In alternative or in addition it could comprise at least one infrared communication link or at least one other type of free-space optical communication link.

Thus, the intermediate transmit/receive unit 56 may be configured to transmit and receive at least one signal over the optical waveguide wired communication link 133 and over the wireless communication link 122, respectively. For example, by means of the optical waveguide wired communication link 133, the intermediate transmit/receive unit 56 may receive at least one signal from, or transmit at least one signal to, the intermediate transmit/receive unit 55, and by means of the wireless communication link 122, the intermediate transmit/receive unit 56 may receive at least one signal from, or transmit at least one signal to, e.g., the power electronics element 28.

The communications network 14 can hence, according to one or more embodiments of the present invention, be described as a communications network having parts or portions thereof employing multi-hop and/or hybrid communication.

FIG. 5 illustrates a scenario where, compared to the scenario illustrated in FIG. 4, the obstacle 100 may be relatively large. Note that the obstacles 100 illustrated in the figures, for example in FIGS. 4 and 5, are not drawn to scale. In order to address this situation, one or more additional optical waveguide wired communication links, e.g., the optical waveguide wired communication link 133, may be deployed, in order for the at least one signal between the control unit 30 and the power electronics element 28 to 'bypass' the obstacle 100 more easily, e.g., for the at least one signal between the control unit 30 and the power electronics element 28 to be conveyed therebetween relatively unobstructed, in spite of the fact that the obstacle 100 is present.

With reference to all of the illustrated embodiments, the antenna(s) of the wireless transceiver(s) of any one of the illustrated elements of the depicted communication networks may for example comprise an RF antenna or an infrared antenna. The antenna(s) may comprise at least one directional and/or polarized antenna, e.g., an RF antenna. By means of a directional and/or polarized antenna, the propagation of at least one signal over the communications network may be facilitated, and interference may be reduced or even minimized.

In conclusion a communications network for communication between at least one power electronics element and at least one control unit is disclosed. According to one or more embodiments of the present invention, the communications network can be described as a communications network having parts or portions thereof employing multi-hop and/or hybrid communication.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

In FIG. 1, element 10 is a communication system or a communication network; each of the elements 19 and 32 is a transmit/receive unit; element 20 is a power electronics element; element 30 is a control unit; each of the elements 41 and 42 is a communication link; and element 50 is an intermediate transmit/receive unit.

In FIG. 2, element 11 is a communications network; each of the elements 20 and 21 is a power electronics element; each of the elements 22-27 is a power electronic component; element 30 is a control unit; element 31 is a control module; each of the elements 32, 34, 36, and 61-66 is a transmit/receive unit; each of the elements 33, 35, 37, 71-76, 93, and 94 is an antenna; element 50 is an intermediate transmit/receive unit; each of the elements 81, 82, and 83 is a wireless communication link; each of the elements 91 and 92 is a wireless transceiver; and element 100 is an obstacle.

In FIG. 3, element 12 is a communications network; each of the elements 20 and 21 is a power electronics element; each of the elements 22-27 is a power electronic component; element 30 is a control unit; element 31 is a control module; each of the elements 38-39 and 61-66 is a transmit/receive unit; each of the elements 71-76 and 109-114 is an antenna; each of the elements 51 and 52 is an intermediate transmit/receive unit; each of the elements 82 and 83 is a wireless communication link; element 100 is an obstacle; each of the elements 101 and 102 is an optical waveguide transceiver; each of the elements 103-108 is a wireless transceiver; and each of the elements 131-132 is an optical waveguide wired communication link.

In FIG. 4, element 13 is a communications network or a communication system; element 28 is a power electronics element; each of the elements 22-27 is a power electronic component; element 30 is a control unit; element 31 is a control module; each of the elements 38 and 61-66 is a transmit/receive unit; each of the elements 71-76, 93-94, 97-98 and 109-111 is an antenna; each of the elements 50, 51, and 54 is an intermediate transmit/receive unit; each of the elements 91-92, 95-96, and 103-105 is a wireless transceiver; element 100 is an obstacle; elements 101 is an optical waveguide transceiver; each of the elements 111, 122-124 is a wireless communication link; and element 131 is an optical waveguide wired communication link.

In FIG. 5, element 14 is a communications network or a communication system; element 28 is a power electronics element; each of the elements 22-27 is a power electronic component; element 30 is a control unit; element 31 is a control module; each of the elements 38 and 61-66 is a transmit/receive unit; each of the elements 71-76, 93-94, 109-111, 136, and 140 is an antenna; each of the elements 50-51 and 55-56 is an intermediate transmit/receive unit; each of the elements 91-92, 95-96, 103-105, 135, and 139 is a wireless transceiver; element 100 is an obstacle; each of the elements 101 and 137-138 is an optical waveguide transceiver; each of the elements 111, 122-124 is a wireless communication link; and element 131 is an optical waveguide wired communication link.

The invention claimed is:

1. A system comprising:
   at least one power electronics element;
   at least one control circuit; and
   a communications network for communication between the at least one power electronics element and the at least one control circuit, the at least one power electronics element and the at least one control circuit being separately arranged, wherein the at least one control circuit is configured to control the at least one power electronics element by transmitting at least one control signal to the at least one power electronics element, each of the at least one power electronics element and the at least one control circuit comprising a transmit/receive circuit configured to transmit and/or receive at least one signal, the communications network comprising:
   at least one communication link for communication of at least one signal over at least a part or portion of the communications network, wherein the at least one communication link at least in part utilizes a wireless communication link and the at least one communication link at least in part utilizes a wired communication link; and
   a plurality of intermediate transmit/receive circuits, each of the plurality of intermediate transmit/receive circuits is configured to receive at least one signal transmitted over the communications network in a direction from the at least one power electronics element and to the at least one control circuit, or vice versa, and transmit the received at least one signal over the communications network in a direction to the at least one control circuit or the at least one power electronics element, respectively, wherein each of the plurality of intermediate transmit/receive circuits is configured to function as a repeater, wherein the intermediate transmit/receive circuit re-transmits the at least one signal which the intermediate transmit/receive circuit has received,
   wherein the at least one power electronics element comprises a converter circuit configured to convert high voltage DC to AC, or vice versa, said converter circuit comprising a plurality of cells, wherein the at least one control circuit is configured to control at least one of the plurality of cells by transmitting at least one control signal to the at least one of the plurality of cells, each of the plurality of cells comprising a transmit/receive circuit configured to transmit and/or receive at least one signal.

2. The system according to claim 1, wherein at least one intermediate transmit/receive circuit is configured to receive and/or transmit at least one signal over a wireless communication link.

3. The system according to claim 1, wherein at least one intermediate transmit/receive circuit is configured to receive and/or transmit at least one signal over a wired communication link.

4. The system according to claim 1, wherein the wireless communication link comprises at least one radio frequency communication link, an infrared communication link or a free-space optical communication link.

5. The system according to claim 1, wherein the wired communication link comprises at least one of: at least one optical waveguide or at least one electrical conductor.

6. The system according to claim 1, wherein the plurality of intermediate transmit/receive circuits are arranged such that one of the intermediate transmit/receive circuits is configured to receive at least one signal transmitted by another one of the intermediate transmit/receive circuits.

7. The system according to claim 6, wherein the one of the intermediate transmit/receive circuits is configured to receive at least one signal transmitted by the other one of the intermediate transmit/receive circuits over a wireless communication link.

8. The system according to claim 6, wherein the one of the intermediate transmit/receive circuits is configured to receive at least one signal transmitted by the other one of the intermediate transmit/receive circuits over a wired communication link.

9. The system according to claim 1, wherein at least one of: the at least one power electronics element, the at least one control circuit or the at least one intermediate transmit/receive circuit comprises at least one directional and/or polarized antenna.

10. The system according to claim 1, wherein the communications network is configured to permit communication between the at least one control circuit and the at least one power electronics element based on Time-Division Multiple Access, TDMA, Space-Division Multiple Access, SDMA, Frequency-Division Multiple Access, FDMA, Orthogonal Frequency-Division Multiple Access, OFDMA, or Code Division Multiple Access, CDMA, or any combination thereof.

11. The system according to claim 1, wherein the communications network is configured to implement half duplex or full duplex communication between the at least one power electronics element and at least one control circuit.

12. The system according to claim 1, wherein the at least one control circuit is configured to control the plurality of cells independently of each other by transmitting at least one control signal to each of the plurality of cells.

13. The system according to claim 1, wherein at least one of the plurality of cells includes an intermediate transmit/receive circuit of the communications network.

14. The system according to claim 1, wherein each of the converter circuit and the at least one control circuit is arranged within a structure or building, and wherein the converter circuit is arranged in a converter valve hall and the at least one control circuit is arranged in a control room.

15. The system according to claim 4, wherein the control room is separately located with respect to the converter valve hall.

16. The system according to claim 2, wherein at least one intermediate transmit/receive circuit is configured to receive and/or transmit at least one signal over a wired communication link.

17. The system according to claim 2, wherein the wireless communication link comprises at least one radio frequency communication link, an infrared communication link or a free-space optical communication link.

18. The system according to claim 3, wherein the wireless communication link comprises at least one radio frequency communication link, an infrared communication link or a free-space optical communication link.

19. The system according to claim 2, wherein the wired communication link comprises at least one of: at least one optical waveguide or at least one electrical conductor.

20. The system according to claim 3, wherein the wired communication link comprises at least one of: at least one optical waveguide or at least one electrical conductor.

21. A communications network for communication between a plurality of power electronics elements and a control circuit, the control circuit configured to control each power electronics element by transmitting a corresponding control signal to a corresponding power electronics element, the communications network comprising:
   a communication link comprising a wired communication link and a wireless communication link, the communication link configured to communicate signals over the communication network; and
   a plurality of intermediate transmit/receive circuits, a respective intermediate transmit/receive circuit configured to:
      receive a first signal over the communications network from a respective power electronics element to the control circuit,
      transmit a second signal over the communications network from the control circuit to the respective power electronics element,
      re-transmit a received signal to the control circuit or the respective power electronics element,
      wherein at least one power electronics element comprises a converter circuit configured to convert high voltage DC to AC, or vice versa, the converter circuit comprising a plurality of cells, the control circuit configured to control at least one cell by transmitting a corresponding control signal to the at least one cell, each cell comprising a transmit/receive circuit configured to transmit and/or receive a corresponding signal.

22. The communications network of claim 21, wherein each power electronics element is separately arranged from the control circuit.

23. A system comprising:
   at least one power electronics element;
   at least one control circuit; and
   a communications network for communication between the at least one power electronics element and the at least one control circuit, the at least one power electronics element and the at least one control circuit being separately arranged, wherein the at least one control circuit is configured to control the at least one power electronics element by transmitting at least one control signal to the at least one power electronics element, each of the at least one power electronics element and the at least one control circuit comprising a transmit/receive circuit configured to transmit and/or receive at least one signal, the communications network comprising:
      at least one communication link for communication of at least one signal over at least a part or portion of the communications network, wherein the at least one communication link at least in part utilizes a wireless communication link and the at least one communication link at least in part utilizes a wired communication link; and a plurality of intermediate transmit/receive circuits, each of the plurality of intermediate transmit/receive circuits is configured to receive at least one signal transmitted over the communications network in a direction from the at least one power electronics element and to the at least one control circuit, or vice versa, and transmit the received at least one signal over the communications network in a direction to the at least one control circuit or the at least one power electronics element, respectively, wherein each of the plurality of intermediate transmit/receive circuits is configured to function as a repeater, wherein the intermediate transmit/receive circuit re-transmits the at least one signal which the intermediate transmit/receive circuit has received, wherein the number of intermediate transmit/receive circuits allows for communication between the at least one power electronics element and the at least one control circuit with a distance of at least hundred meters between the at least one power electronics element and the at least one control circuit, and wherein the at least one power electronics element comprises a converter circuit configured to convert high voltage DC to AC, or vice versa, said converter circuit comprising a plurality of cells, wherein the at least one control circuit is configured to control at least one of the plurality of cells by transmitting at least one control signal to the at least one of the plurality of cells, each of the plurality of cells comprising a transmit/receive circuit configured to transmit and/or receive at least one signal.

* * * * *

UNITED STATES PATENT AND TRADEMARK OFFICE
CERTIFICATE OF CORRECTION

PATENT NO. : 11,177,857 B2
APPLICATION NO. : 16/467385
DATED : November 16, 2021
INVENTOR(S) : Zhibo et al.

Page 1 of 1

It is certified that error appears in the above-identified patent and that said Letters Patent is hereby corrected as shown below:

In the Claims

Claim 15, Column 19, Line 61; delete "claim 4" and insert --claim 14--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*